July 21, 1942.  A. E. ALDERMAN  2,290,793
COMBINATION CAMERA AND ILLUMINATOR
Filed March 25, 1940  2 Sheets-Sheet 1

INVENTOR.
ALONZO E. ALDERMAN
BY
ATTORNEY.

July 21, 1942.   A. E. ALDERMAN   2,290,793
COMBINATION CAMERA AND ILLUMINATOR
Filed March 25, 1940   2 Sheets-Sheet 2

INVENTOR.
ALONZO E. ALDERMAN
BY
ATTORNEY.

Patented July 21, 1942

2,290,793

UNITED STATES PATENT OFFICE 2,290,793

COMBINATION CAMERA AND ILLUMINATOR

Alonzo E. Alderman, Washington, D. C., assignor to Burton Manufacturing Company, Inc., Chicago, Ill., a corporation of Illinois Application March 25, 1940, Serial No. 325,816

2 Claims. (Cl. 240—2)

This invention relates generally to photographic cameras and, more particularly, to a certain new and useful combination camera and illuminator.

My invention has for its principal object the provision of a unique, compact, convenient, and efficient structure of the type stated adapted especially, though not exclusively, for the rapid photographing of diseased parts of the human body for physicians', surgeons', and dentists' use.

My invention has for a further object the provision of a photographic structure of the class mentioned which is capable of providing extremely flat lighting upon the object being photographed, which may be focused upon the subject and the shutter operated at the desired instant while the structure is being manually manipulated by the photographer, and which enables the taking of a successive series of photographs at relatively short intervals for producing a series of so-called "stills" which will follow the sequence of a dental or surgical operation, for instance.

My invention has for an additional object the provision of a photographic structure of the type stated which is rugged, durable, and economical, which is extremely attractive in appearance, simple in operation, readily portable, and highly efficient in the performance of its stated functions.

And with the above and other objects in view, my invention resides in the novel features of form, construction, arrangement, and combination of parts presently described and pointed out in the claims.

In the accompanying drawings (2 sheets)—

Figure 1:
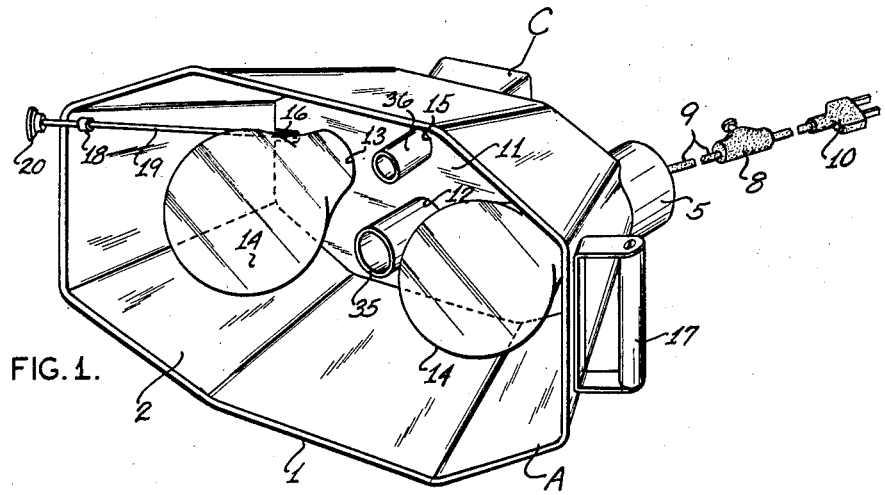
Figure 2:
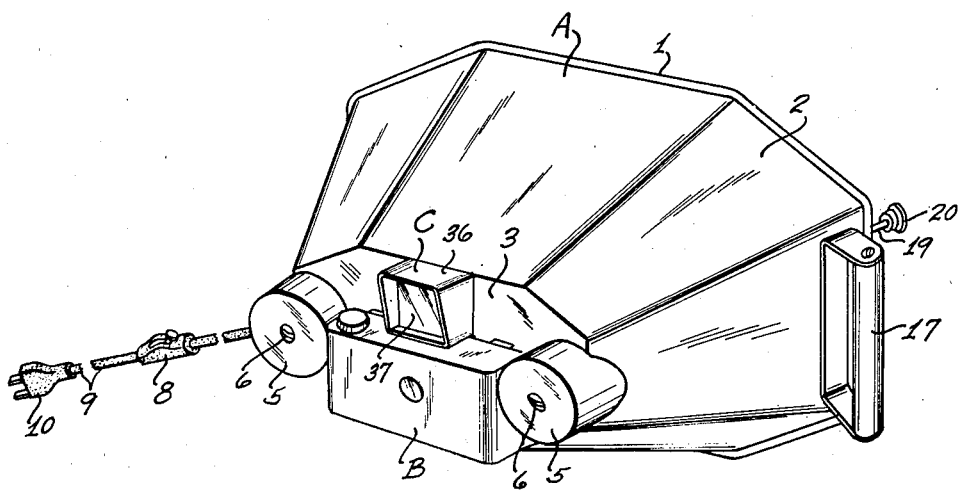
Figure 3:
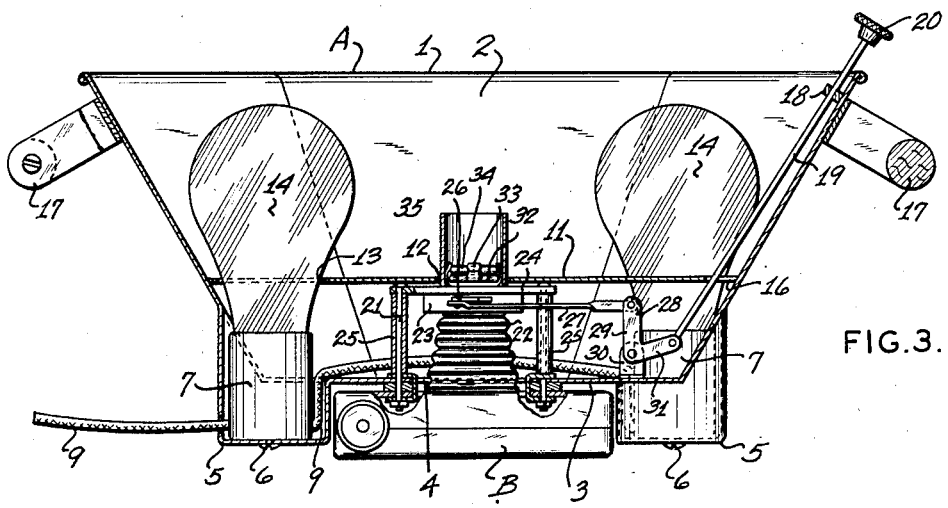
Figure 4:
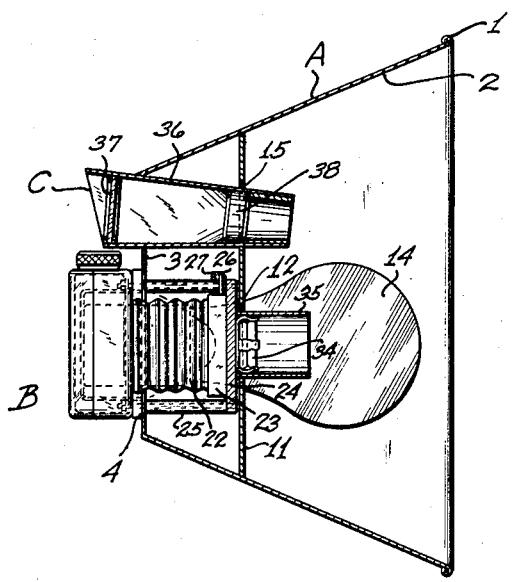

Figures 1 and 2 are front and rear perspective views, respectively, of a combination camera and illuminator constructed in accordance with and embodying my present invention; and Figures 3 and 4 are transverse and longitudinal sectional views, respectively, of the combination camera and illuminator.

Referring now in more detail and by reference characters to the drawings, which illustrate a preferred embodiment of my present invention, the combination camera and illuminator comprises an open-ended bowl-like reflector shell A having a peripheral bead or rolled edge 1 and preferably integrally including a plurality of rearwardly converging side walls 2 and a transverse end wall 3, the latter, in turn, having a central aperture 4 and a pair of symmetrically arranged rearwardly extending cup-like housings 5 opening to the interior of the shell A, as best seen in Figure 3. Fixed, as by means of suitable securing members 6, in the housings 5, are conventional electric lamp sockets 7 connected in parallel to a conventional manually operable switch 8 by means of an electrical conduit 9 provided at its outer end with a conventional plug element 10 for connection to a source of electric current (not shown).

Marginally welded or otherwise secured in, and extending transversely across the interior of, the reflector shell A in forwardly spaced parallel relation to the transverse end wall 3, is a flat reflector wall 11 having a central aperture 12 in axial alignment with the end wall aperture 4 and a pair of symmetrically arranged apertures 13 in registration with the sockets 7 and diametrally sized for accommodating the necks of photoflood electric lamps or other conventional light sources 14. The reflector wall 11 is also provided with an auxiliary aperture 15 spaced upwardly from the central aperture 12 and adjacent its outer margin with a U-shaped slot 16, all as best seen in Figures 3 and 4 and for purposes presently more fully appearing. In this connection, it will, of course, be obvious that the forwardly presented face of the side walls 2 and reflector wall 11 are polished, plated, mirrored, or otherwise treated to afford any desired type of light-reflecting characteristics.

Upon the outer faces of two opposed side walls 2, the shell A is provided with conventional hand grips 17, and adjacent one of such handles 17 the shell A is provided with an inwardly projecting block or the like 18 transversely apertured for shiftably accommodating an elongated rod 19 projecting adjacent its inner end through the slot 16 and at its other end projecting outwardly beyond the shell peripheral bead 1 and provided with a finger-button 20 for convenient manual manipulation, as will be presently more fully explained.

Fixed, as by means of inwardly extending studs 21, upon the outer face of the end wall 3, is a conventional photographic camera B having its bellows 22 presented inwardly through the aperture 3 and its lens housing 23 securely fixed within a cross plate 24, in turn, rigidly secured between the heads of, and spacer sleeves 25 mounted upon, the studs 21.

The shutter operating lever 26 of the camera B is connected by means of a transverse link 27 to one arm 28 of a bell-crank 29 conventionally pivoted in a clevis 30 welded or otherwise securely mounted upon the inner face of the shell end wall 3, the other arm 31 of the bell-crank 29 being pivotally connected to the inwardly projecting end of the actuating rod 19.

The camera lens 32 is preferably provided with a conventional filter-holding clip 33, color filter 34, and light-shading tube 35, which latter projects forwardly through the aperture 12, all as best seen in Figures 3 and 4.

Mounted securely in, and extending longitudinally through, the shell end wall 3 and the aperture 15 of the reflector wall 11, is a so-called view-finder C including a sighting tube 36 having a ground glass screen 37 adjacent its rearwardly presented end and a lens 38 adjacent its forwardly presented end, as best seen in Figure 4. In this connection, it should be pointed out that the lens 38 should have substantially the same optical properties and characteristics and be positioned substantially in the same plane as the lens 32 of the camera B. Similarly the ground glass screen 37 should preferably be positioned substantially at a distance from the optical center of the sighting lens 38 substantially equal to the distance between the optical center of the camera lens 32 and the film within the camera B. Thus, it will be evident that the view-finder C has an optical system substantially equivalent to that of the camera for permitting the operator to view both the focus and composition of the photograph being taken. It will further be noted by reference to Figure 4 that the optical axis of the view-finder is oblique to the optical axis of the camera.

In use, the plug member 10 is conventionally inserted into any convenient electrical outlet and the switch 8 turned on, so that the photo-flood bulbs 14 will be lighted. The handles 17 are grasped, and the combination camera and illuminator presented at its forward end toward the object to be photographed. Since the camera B is preferably of the fixed focus type, the operator will walk either toward or away from such object while viewing the same upon the sighting screen 37, thereby bringing the object into sharp focus. As soon as the desired sharpness of focus is achieved, as indicated upon the sighting glass 37, the operator, while still firmly gripping the handles 17, may depress the finger-button 20 and thereby, through the rod 19, bellcrank 29, and link 27, actuate the shutter lever 26. After the particular picture has been photographed, the film is conventionally advanced and, if desired, a subsequent picture taken in identically the same manner.

It will be evident that, by my present invention, I have provided a combination camera and illuminator which is conveniently manually portable, and which may most conveniently be unitarily positioned and manipulated. In addition, the flat penetrating and highly concentrated illumination provided by the structure enables the photographing of scientific subjects at relatively high shutter speeds, and this is particularly true with respect to the photographing of medical and surgical operations which take place within the confines of cavities of the human body, such, for example, as intra-oral operations in dentistry and intra-rectal operations in surgery.

It should be understood that changes and modifications in the form, construction, arrangement, and combination of the several parts of the combination camera and illuminator may be made and substituted for those herein shown and described without departing from the nature and principle of my invention.

Having thus described my invention, what I claim and desire to secure by Letters Patent is:

1. A combination camera and illuminator for close-up photography of dental and surgical operations and the like, including, as a unitary structure, a bowl-shaped reflector provided with a pair of oppositely presented handles and having a plurality of light sources disposed therein, a camera mounted in the reflector between the light sources and having a fixed-focus optical system, separate optical means mounted in the reflector and having a fixed focus optical system substantially equivalent to that of the camera and having its optical axis at such an angle to the optical axis of the camera that the point of intersection of said axes lies substantially in the plane of optimum focus of the camera for permitting the operator to quickly focus and view the composition of the photograph being taken, and shutter actuating means connected to the camera and having a finger-button positioned adjacent one of the handles for convenient manipulation while the handle is being gripped.

2. A reflector for supporting a photographic camera having a fixed-focus optical system and being adapted for close-up photography of dental and surgical operations and the like comprising a bowl-shaped shell having a rear wall provided upon its outer face with a camera mount and apertured for permitting the lens of the camera to extend through the rear wall, a plurality of light sources mounted in the reflector on opposite sides of said aperture, and an independent view-finder mounted in and extending through the rear wall in spaced relation to the camera mount, said view-finder including a lens and a viewing screen disposed in approximate coplanar alignment with the lens and film holding portions of the camera, respectively, said lens and screen forming an optical system substantially equivalent to that of the camera and having its optical axis disposed at such an angle to the optical axis of the camera that the point of intersection of said axes lies substantially in the plane of optimum focus of the camera for permitting the operator to quickly focus, and view the composition of, the photograph being taken.

ALONZO E. ALDERMAN.